United States Patent

[11] 3,597,573

[72] Inventor Donald H. Ettinger
  Royal Oak
[21] Appl. No. 194
[22] Filed Jan. 2, 1970
[45] Patented Aug. 3, 1971
[73] Assignee Warren Fastener Corporation
  Mount Clemens, Mich.

[54] WELDING STUD AND FERRULE-STUD ASSEMBLIES
  6 Claims, 4 Drawing Figs.

[52] U.S. Cl. ................................................. 219/99
[51] Int. Cl. ............................................... B23k 9/20
[50] Field of Search ..................................... 219/98; 1/99

[56] References Cited
UNITED STATES PATENTS

| | | | |
|---|---|---|---|
| 2,491,479 | 12/1949 | Dash | 219/99 |
| 2,638,525 | 5/1953 | Candy | 219/99 |
| 3,037,109 | 5/1962 | Glover | 219/99 |
| 3,094,607 | 6/1963 | Flynn et al. | 219/99 |
| 3,242,307 | 3/1966 | Mowry et al. | 219/99 |

Primary Examiner—J. V. Truhe
Assistant Examiner—Robert E. O'Neill
Attorneys—W. Bigelow Hall, Richard A. Wise, Richard B. Megley and Carl E. Johnson ABSTRACT: An arc weldable stud is adapted to be initially inserted into predetermined gas-sealing relation within a semipermanent ferrule associated with the holding collet of a welding gun whereupon the weldable end of the stud, retractable axially in the ferrule and having a diameter permitting subsequent relative withdrawal of the gun from the welded stud, may be simultaneously applied by the gun with the ferrule to a work surface. The welding head of the stud has a belt of larger diameter than the remainder of the head but approximately equal to the clearance hole for the stem of the stud.

PATENTED AUG 3 1971
3,597,573
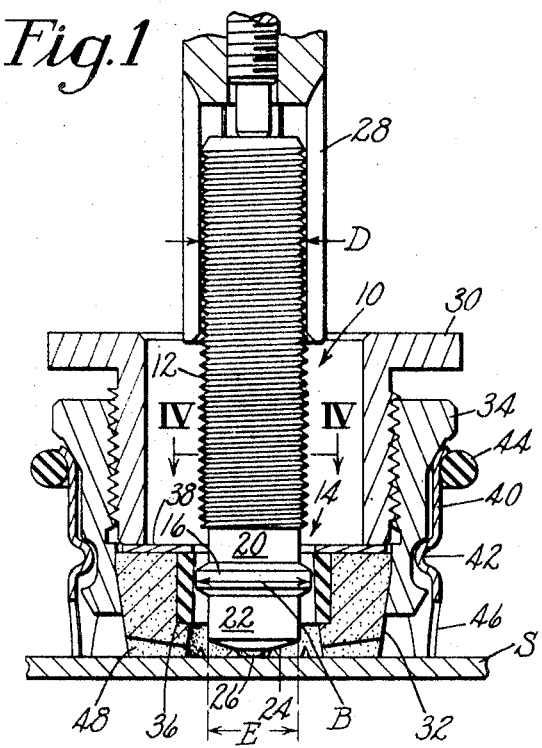
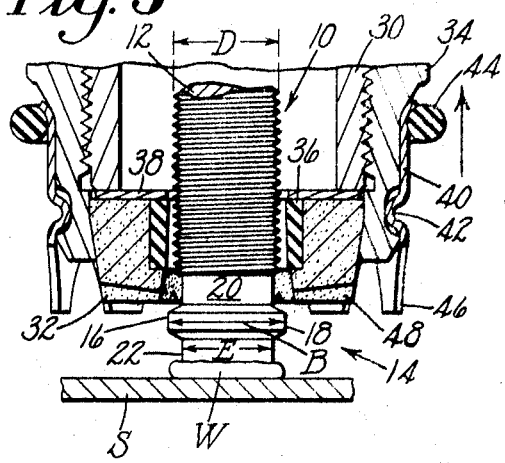
Inventor
Donald H. Ettinger
By his Attorney
Carl E. Johnson 3,597,573

WELDING STUD AND FERRULE-STUD ASSEMBLIES

CROSS REFERENCE TO RELATED APPLICATION

U.S. application Ser. No. 813,239 filed Apr. 3, 1969 in the name of Herbert F. Rondeau now U.S. Pat. No. 3,557,339 is directed to the semipermanent arc shield or welding ferrule of the type preferably employed with the studs of the present invention when arc welding them.

BACKGROUND OF THE INVENTION

This invention relates to weldable studs, threaded or unthreaded, and especially to an assembly with a semipermanent ferrule of such cylindrical metal members which are to be secured to a support as by arc welding. The preferred welding method utilizing the ferrule of the cited copending application practices a drawn-arc concept wherein current in the welding circuit passing through the stud is in an opposite direction to that passing through the ferrule thereby confining the molten materials to the immediate vicinity of the weld. The present invention may be practiced with such a circuit or in one wherein, as is more common perhaps, the welding current flows through the stud and through the support to which the stud is being secured without returning through the ferrule.

In the prior art it has been customary, particularly when arc welding a stud or the like larger than one-quarter inch diameter to a supporting surface, to employ an expendable ferrule (usually a ceramic ring) for enclosing the welding area. Prior to the mentioned Rondeau disclosure the sequence of basic steps in each welding cycle has usually required:

1. insertion of a stud endwise into a holding collet of a gun;
2. application of the ferrule over the welding end of the stud and onto the gun;
3. upon placing the gun with its ferrule and stud contacting the surface to which the stud is to be welded, retracting the stud from that surface while striking an electric arc therebetween;
4. plunging the molten stud end into the material of the supporting surface and terminating current flow, and
5. lastly, withdrawing the gun and fracturing and discarding the ferrule.

Not only is such practice costly as regards the use of expendable ferrules, but it entails inconvenience and prevents achieving a good production rate. A ferrule of the clay type is retractable from its retainer on the gun face at the time the stud is extracted from its collet. A gun may be withdrawable without fracturing the clay ferrule but this ferrule must generally be fractured to enable proper use of the stud adjacent to its weldment.

The welding ends of studs upon which the earlier expendable ferrules were disposed in a gun often had a generally conical contour provided with welding flux. The configuration of the stud itself was usually not critically determined in relation to the ferrule since the latter was viewed as only a temporary heat retaining shield to be destroyed. The proposed semipermanent ferrule or arc shield disclosed in the above cited patent affords an opportunity to introduce an improved stud configuration advantageously cooperating with the ferrule and additionally providing incidental benefits hereinafter to be described.

SUMMARY OF THE INVENTION

In view of the foregoing it is an object of this invention to provide an improved welding stud, the configuration of its weldable end being especially well adapted for cooperation with and extending the longevity of a repeatedly usable arc welding ferrule.

It is a further object of this invention to provide, for use in a welding gun having a stud-holding collet and a ferrule in telescoping relation therewith, a stud-type fastener provided with an advantageously shaped weldable end portion having predetermined sealing relation with the interior of the ferrule.

In accordance with the foregoing objects a feature of the invention resides in the provision of a stud having a stem portion of uniform diameter, and a weldable, coaxial, integral end portion shorter than the stem portion, the weldable end portion having a circumferential belt of larger diameter than that of the stem portion for serving as a seal.

More especially, the invention in one form contemplates, especially for arc welding studs of larger than one-quarter inch diameter, the combination with an electrically conductive ferrule coaxially carrying an insulating bushing formed with a predetermined minimum inside wall diameter, a welding stud having a stem portion and a weldable cylindrical end portion axially movable in said bushing, the radial clearance between a circumferential belt formed on said cylindrical end portion and the internal wall of the bushing being a minimum of about 0.002 inch and a maximum of about 0.005 inch.

BRIEF DESCRIPTION OF THE DRAWINGS

The invention will now be more particularly described with reference to an illustrative embodiment and in connection with the accompanying drawings, wherein:

FIG. 1 is a longitudinal section showing my novel stud with its sealing belt and in ferrule-stud assembly as fitted to a welding gun and disposed on a support to which the stud is to be secured;

FIG. 2 is a view similar to FIG. 1 but with the stud retracted to draw an arc;

FIG. 3 is a similar view showing the ferrule being withdrawn from the welded stud; and FIG. 4 is a section taken on the line IV-IV of FIG. 1 and showing the important stud belt clearance.

DESCRIPTION OF THE PREFERRED EMBODIMENTS

Referring to FIG. 1 a welding stud generally designated 10 has a stem portion 12 and a coaxial integral, weldable head end portion 14. While the stem portion 12 may be plain, it more often will be formed with rolled or cut threads and preferably have a standard predetermined major diameter D. The end or head portion 14 is cylindrical and shorter than the stem portion. Also, for reasons hereinafter to be explained, the head portion is formed intermediate its length with a circumferential belt 16 of substantially uniform radial thickness and axial width of outer sealing surface 18. On opposite sides of the belt 16, the head portion is formed with blank surfaces 20, 22 of a diameter E that is less than D (but substantially equal to the blank diameter for a rolled thread) and most importantly the diameter B of the belt 16 is larger than the diameter D by a dimension on the order of from about 0.015 inch—0.025 inch. As shown in FIGS. 1—3, the belt 16 preferably has sloping shoulders adjoining the surfaces 20, 22 to facilitate entry of the stud into the gun and reduce wear upon its ultimate removal from the welded stud.

While for present purposes the configuration of the extreme end face 24 of the welding head is not in itself unique, this face may be semiconical or generally conical having an apex angle of about 150°, and may have a projecting central flux tip or getter 26 inserted in the stud.

It will be understood that an arc welding gun (not shown) is fitted with a stud-holding collet 28 (FIGS. 1 and 2) for receiving the stud 10 endwise. Other means not herein fully shown but including, for instance, a ferrule assembly comprising an externally threaded and flanged collar 30 is employed for mounting a semipermanent shield or ferrule 32 (such as the type referred to in the cited Rondeau application) on the gun in telescoping relation to the stud 10. As herein illustrated the collar 30 receives an internally threaded ferrule holder 34, a conical internal surface of the latter engaging a corresponding external portion of the ferrule 32 to draw the latter under axial compression toward the gun. To prevent shunting of current from the stud 10 to the conductive ferrule as might occur on a direct contact or a "creep-up" of the welding arc within the ferrule, an insulating ring 36 nested in the ferrule is preferably detachably retained by a clamping washer 38 extending between an end of the collar 30 and the inner end of the ferrule. Since the ferrule may be of carbon or other material subject to chipping and wear and vulnerable to impact engagement with a surface S to which the stud is to be secured, a guard sleeve 40 is desirably mounted on the holder 34. For this purpose the sleeve is formed with a crimp 42 adapted to snap into an annular recess on the holder. For permitting limited yield the inner end of the sleeve is slidably secured by an elastic O-ring 44 on a tapering portion of the holder 34, and its outer end is preferably formed with spaced protective projections 46 which may be disposed for radial alignment with gas outlets 48 preferably formed in the ferrule.

It will be understood that the ferrule 32 need not, for present purposes, be conductive and lined with an insulating ring 36 (of boron nitride, for example) but that in any case the ferrule and/or its ring has a circumferential locality spaced axially from the welding zone as shown in FIG. 1 and at which a near-sealing relation is to be maintained with the stud head 14 during the welding operation. It accordingly is especially important that the belt surface 18 be axially disposed on the head so that although its diameter B will at no time completely close the bore of the ferrule assembly, it will provide a substantially sealed relation with the internal cylindrical wall of that bore. Not only does the belt 16 thereby desirably retain heat when high welding temperature is created and prevent spatter of molten globules of metal but it affords an air gap of predetermined volume about the welding zone. FIG. 2 shows the near-sealing relation maintained by the belt 16 when the stud 10 has been relatively retracted in the ferrule and the welding arc initiated, whereas in FIG. 1 the belt 16 is indicated in its initial position within the gun and the ring 36. In both positions the belt desirably has a radial gap with the wall of the bore of the ferrule or ferrule assembly which is not less than about 0.005 inch and not more than about 0.020 inch.

Upon plunging the molten end of the stud 10 axially into the adjacent melted material of the surface S, the belt 16 continues to have substantial sealing relation with the ferrule assembly. The weldment W (FIG. 3) having been formed and current flow discontinued, the gun may now be completely retracted along with the intact ferrule assembly from the stud as illustrated, the threaded stem portion 12 clearing the ring 36 without causing harmful abrasion of the ring. The gun is then immediately ready to receive the next stud 10 to be welded.

While it is acknowledged that the making of the stud 10 with its unique head configuration is slightly more costly than for standard studs, the stud of this invention provides additional benefits inherently such that upon balance, the ultimate installed cost per welded stud clearly yields a net economic advantage. Some of these benefits provided by the configuration of the stud 10 may be listed as follows:

1. Only the stud 10 (not a stud plus a new ferrule) need be presented to the gun prefitted with the semipermanent ferrule 32 thus shortening the overall time of the cycle and facilitating operation without sacrificing any quality in the weld.
2. It makes a gas seal with safety during welding.
3. It retains heat and properly confines metal globules.
4. Because the belt protrudes beyond the major diameter of the stem, there is less tendency for its thread to wear the insulating ring; solidified globules might, without the belt, tear a boron insulator ring, for example, on removal of the gun.
5. The belt serves as a convenient means whereby the studs can be handled, successively fed, and uniformly positioned both during their movement outside of the gun and within it, especially when the gun is designed to be automatically supplied with the studs by mechanical means not herein illustrated.
6. The belt aids in registering and locating each stud with respect to the surface to which it is to be secured.

Having thus described my invention, what I claim as new and desire to secure by Letters Patent of the United States is:

1. An arc welding stud having a stem-portion of uniform diameter, and an integral, weldable coaxial head end portion shorter than the stem portion, the head end portion being characterized by including along its axial length an intermediate circumferential belt of slightly larger diameter than that of the remainder of the head portion and adapted by its radial protrusion from the remainder of said head end portion for substantial sealing cooperation with the wall of a receiving bore of a welding gun ferrule.

2. A stud as set forth in claim 1 wherein the stem portion is threaded, and the belt is intermediate blank cylindrical head portions which are substantially equal in diameter to the blank diameter on which the stem thread is rolled.

3. A stud as set forth in claim 1 wherein said belt is formed with at least one axially sloping shoulder.

4. The combination with a welding gun ferrule having an interior wall providing a bore coaxial with a stud gripping collet of the gun, said collet being axially movable relative to said ferrule, of a stud having a stem to be gripped by the collet for effecting telescoping movement of the stud within said bore, said stud having a weldable head portion circumferentially formed with a radially protruding belt, said belt having a uniform axial outer dimension less than one-half that of the head portion overall and of a diameter slightly larger than that of the stem and slightly smaller than that of the bore, said belt being spaced from an extremity of the head and disposed in the bore to provide slidable, substantially closed sealing relation with said ferrule wall.

5. The combination ferrule and stud as set forth in claim 4 wherein said belt is disposed intermediate cylindrical blank portions of the weldable stud head, the belt being adapted, in both an initial work engaging position and a relatively retracted arc-drawing position to maintain a nearly closed gas sealing relation with said ferrule wall.

6. The combination as set forth in claim 5 wherein the diameter of the external surface of the belt provides a uniform radial gap in a range having a minimum clearance with said ferrule wall of about 0.005 inch and a maximum clearance with said wall of about 0.020 inch.